United States Patent [19]

Velan

[11] 4,199,850
[45] Apr. 29, 1980

[54] METHOD OF MAKING A DIAPHRAGM VALVE

[75] Inventor: Adolf K. Velan, Westmount, Canada

[73] Assignee: Velan Engineering Ltd., Montreal, Canada

[21] Appl. No.: 837,204

[22] Filed: Sep. 27, 1977

Related U.S. Application Data

[63] Continuation-in-part of Ser. No. 612,590, Sep. 11, 1975, abandoned.

[51] Int. Cl.² .................. B23P 15/00; F16K 41/12
[52] U.S. Cl. .......................... 29/157.1 R; 29/445; 251/335 A
[58] Field of Search ............. 29/157.1 R, 157 R, 445, 29/454; 113/116 B; 92/98 R, 101; 251/335 A

[56] References Cited

U.S. PATENT DOCUMENTS

| | | | |
|---|---|---|---|
| 2,221,672 | 11/1940 | Doran | 29/156.8 R |
| 2,602,627 | 7/1952 | Britton | 251/335 A |
| 2,701,075 | 2/1955 | Coffman | 220/89 A |
| 3,685,686 | 8/1972 | Raidl | 220/89 A |
| 3,874,636 | 4/1975 | Bake et al. | 251/335 A |
| 3,922,767 | 12/1975 | Solter et al. | 29/157 R |
| 3,979,105 | 9/1976 | Pool et al. | 251/335 A |
| 3,982,729 | 9/1976 | Tricini | 251/335 A |

FOREIGN PATENT DOCUMENTS

| | | | |
|---|---|---|---|
| 687260 | 8/1930 | France | 251/335 A |

Primary Examiner—Daniel C. Crane

[57] ABSTRACT

The method of producing a cage unit for mounting a metal diaphragm in a hermetically sealed diaphragm globe valve having a valve body and bonnet of forged austenitic stainless steel in which the diaphragm unit consists of 8 to 12 very thin (0.006"–0.008") Inconel 718 discs so that the cage unit can be installed by welding, in the field, to the bonnet without requiring any special skills; the cage unit supporting the metal diaphragm and being compatible to being welded to the forged austenitic stainless steel and comprising a pair of annular metal retaining rings situated on opposite sides of the plural-disc, metal diaphragm which is squeezed therebetween; the retaining rings including heat-sink portions about the outer peripheries, and the cage unit, when welded in the bonnet of the valve, preventing leakage to the atmosphere of liquids passed through the valve in which the method comprises the steps of: stacking a plurality of thin metal discs; sandwiching the stacked discs between annular members and applying a peripheral weld completely around the discs and annular members forming a peripherally sealed cage unit; deforming the sandwiched discs to a selected contour; heat treating the cage unit and stress relieving the discs; orienting the cage unit in a valve bonnet and peripherally welding one of the annular members to the bonnet and forming a sealed joint therebetween.

11 Claims, 2 Drawing Figures

METHOD OF MAKING A DIAPHRAGM VALVE

This application is a continuation-in-part of application Ser. No. 612,590, filed Sept. 11, 1975 now abandoned.

BACKGROUND OF INVENTION

(a) Field of the Invention

The present invention relates to valves and, in particular, to an improved hermetically sealed diaphragm globe valve for use with hazardous, toxic or radioactive fluids where escape to atmosphere could cause fire, explosion or be poisonous.

(b) Description of the Prior Art

Maximum reliability over a life-span of 40 years is a basic requirement for valves in nuclear service. This emphasis on long-term reliability arises as a result of the need to ensure that nuclear plants do not threaten public safety due to malfunction or leakage of radioactive coolant. In addition, corrective maintenance under radiological control procedures is very difficult and generally not anticipated.

There are basically two potential leakages in standard valves. For ease of maintenance, gasketed bolted bonnet designs are widely used with provision for seal welding. If seal welding is not used, the reliability of the gasket joint is questionable because of relaxation of gasket materials and body bonnet bolting due to thermal fatigue. Seal welding can eliminate the body bonnet joint leakage; however, removal of the weld is required in order to service the internal components of the valve. To eliminate potential leakage of body bonnet joints, welded bonnet or bonnetless designs are available. The second potential leakage, which is through the stem seal, cannot be eliminated in these designs.

In an attempt to eliminate entirely the potential leakage through body-bonnet joints and stem seals, bellows seal valves have been utilized, these valves offering a complete solution to the potential leakage. The disadvantage associated with bellows seal valves is the considerable length of the bellows which, depending on the operating pressure, must be 8 to 12 times the valve lift. This makes the overall length of a valve with a bellows seal, especially on large gate valves, impractical. In addition, it is difficult to predict the quality and reliability of the metal bellows required for high pressure service, although considerable progress has been made in the last few years and reasonably reliable solutions have been found.

In recent years, metal diaphragm valves for globe valves in sizes ¼-2″ have been developed to compete with bellows seal valves. This was possible due to the availabilty of a highly efficient nickel-chromium alloy type Inconel 718 for the construction of the metal diaphragm. The diaphragm consists of a series of specially shaped plates separating the valve disc and stem and providing simultaneously the seal for the body-bonnet joint and stem. Since the left in such valves is limited, the valve body geometry must be inclined to provide reasonable flow conditions with minimum resistance.

In one known metal diaphragm valve design, the metal diaphragm consists of a multiple set of thin plates of Inconel 718, clamped between the body and bonnet of the valve, establishing a metal-to-metal seal. The large compressive forces required to seal the peripheral edge of the diaphragm are provided by a long, threaded engagement between body and bonnet. A stem and valve disc are separated by the diaphragm.

There is, however, little difference between this nuclear valve design and a standard low-priced "union bonnet" globe valve used in low pressure applications in refineries with a metal-to-metal body-bonnet joint. Further, the valve construction is not considered to be hermetically sealed, but rather a metal gasketed valve with a screwed bonnet. Leakages to the environment can occur under the following circumstances even with the diaphragm itself in operating condition. The screwed bonnet can vibrate off or the original torque required for the seal can be reduced by thermal fatigue. This would relax the metal-to-metal contact pressure, resulting in leakage around the diaphragm through the threaded portion to the atmosphere, as well as around the stem, unless the secondary stem seal with standard packing rings is tight.

The multi-ply metal diaphragm acts as a metal gasket which, in itself, is not considered as an efficient gasket type for high pressure-temperature applications. As well, screwed joints without seal welding are not recommended by the ASME Section III Code. However, with this particular design, even a seal weld between body and bonnet would eliminate only the possibility of leakage through the body-bonnet joint, with the leak pattern around the stem still existing, thus exposing the secondary stem seal to full pressure. Also, a seal weld will eliminate the possibility of readjustment.

In an attempt to eliminate the disadvantages associated with the metal diaphragm valve referred to above, it has been proposed to place the metal diaphragm plates in a cartridge unit which is then placed in the body of the valve without welding. Tightness between diaphragm and body is achieved by a pressure seal effect. The bonnet is screwed into the body and seal welded to prevent leakage to the environment through the body-bonnet joint. While the leak pattern through the body bonnet joint is eliminated in this design, the leak pattern around the cartridge-body seal and around the stem seal is still possible even with a perfectly intact diaphragm.

To eliminate entirely the potential leakage through body-bonnet joints and stem seals U.S. Pat. No. 3,874,636, issued Apr. 1, 1975 to Bake, et al discloses a hermetically sealed valve intended to prevent environmental leakage and includes a multi-ply flexible metal diaphragm which must be seal welded directly to the bonnet, as well as requiring a seal welded body-bonnet joint; this construction is intended to eliminate the possibility of leakage through a mechanical joint used in the above-noted diaphragm valve construction.

A problem associated with the Bake, et al valve construction is the fact that the multi-ply metal diaphragm must be welded directly to the bonnet; in particular, the thin metal discs which form the metal diaphragm can become distorted during welding thereof to the heavy bonnet and to a metal ring situated therebeneath; the thin metal discs forming the diaphragm are made from Inconel 718 nickel chromium alloy, which is a high strength, corrosion resistant material having a very high fatigue strength; this latter feature, which is of importance insofar as the operation of the metal diaphragm is concerned, can only be achieved if the Inconel 718, after forming and welding, is annealed and aged. In the annealed condition, the Inconel 718 has a yield strength of 76,000 PSI at room temperature; after aging, the yield strength is increased to 150,000 PSI, and the high temperature fatigue strength at 600° operating temperature after B $10^5$ cycles is 115,000 PSI. The annealing temperature is 1750° F. for one hour with subsequent air cooling. The most suitable aging recommended for the service in a diaphragm valve by INCO is 1325° F. for 8 hours, furnace cooled to 1150° F. and aging time of B 4 hours with subsequent air cooling.

In the case of nuclear diaphragm valves such as that disclosed by Bake, et al, the body and bonnet are generally produced from austenitic stainless steel, or the like. After welding the Inconel metal discs, which form the metal diaphragm to the bonnet, problems can be encountered insofar as heat treating the diaphragm plates and the weld. In particular, the heat-treating requires temperatures in excess 1300° F. to eliminate stresses in the Inconel plates created during the forming and welding of the metal plates. The bonnet, being manufactured from austenitic stainless steel, cannot be subjected to such temperatures in excess of 800° F. due to carbine precipitation which would render the stainless steel unusable without subsequent solution annealing at 2100° F., then quenching in water. However, solution annealing is not acceptable from the standpoint of the high tensile properties of the Inconel 718 acheieved during the aging process, which would be destroyed by solution annealing. Also, solution annealing could develop cracks in the seal weld. It is, therefore, difficult with the Bake, et al valve design to achieve optimum design conditions for Inconel 718 recommended by the International Nickel Company in their catalogue entitles "Inconel Alloy 718", Second Edition 1973.

Since the metal diaphragm discs or plates cannot readily be subjected to proper annealing and aging the cycle life of the metal diaphragm could possibly be limited. Further, in view of the thinness of the metal plates or discs forming the diaphragm, the diaphragm can become distorted during welding thereof to the heavy bonnet. Since the discs must be welded carefully to the bonnet and ring, replacement of the diaphragm cannot be readily effected at the site, but rather must be carried out in a factory with special welding equipment under special control conditions. As a result, unnecessary down time to replace a broken diaphragm can result when utilizing a metal diaphragm welded directly to the bonnet and ring components of the prior art diaphragm valve.

SUMMARY OF INVENTION

In order to overcome the above drawbacks associated with known metal diaphragm nuclear valve constructions, the present invention proposes to utilize a metal diaphragm comprising thin Inconel 718 discs or plates sandwiched between two retaining rings, the diaphragm and retaining rings being seal welded into a cage unit cartridge which can be easily replaced and welded to the bonnet, even in the field. In particular, outer peripheries of the multi-ply flexible metal discs forming the metal diaphragm, in the case of the present invention, are electro-beam seal welded between two Inconel 600 retaining rings, preventing leakage to atmosphere of nuclear, corrosive or radioactive fluids passing through the valves. Subsequent to final forming of the diaphragm discs or plates, the cage unit is subjected to annealing and aging in strict compliance with recommendations proposed by the International Nickel Company in their catalogue referred to above, resulting in extreme fatigue strength, high yield strength of 150,000 psi, with 115,000 psi fatigue strength at $10^5$ cycles. The cage unit top retaining ring, made from Inconel 600, can then seal welded to the forged austentic stainless steel bonnet using conventional welding procedures. This welding process is straightforward and does not require special welding skills, control conditions and/or subsequent heat treating as the geometry of the retaining ring is such that the seal welding process does not affect, in any way, the metal diaphragm. The cage units can be stocked and valves easily serviced in the field, which is apparently not possible in prior art valve constructions.

BRIEF DESCRIPTION OF THE DRAWINGS

A preferred embodiment of the invention will be described with reference to the accompanying drawing wherein.

DESCRIPTION OF PREFERRED EMBODIMENT

Figure 1:
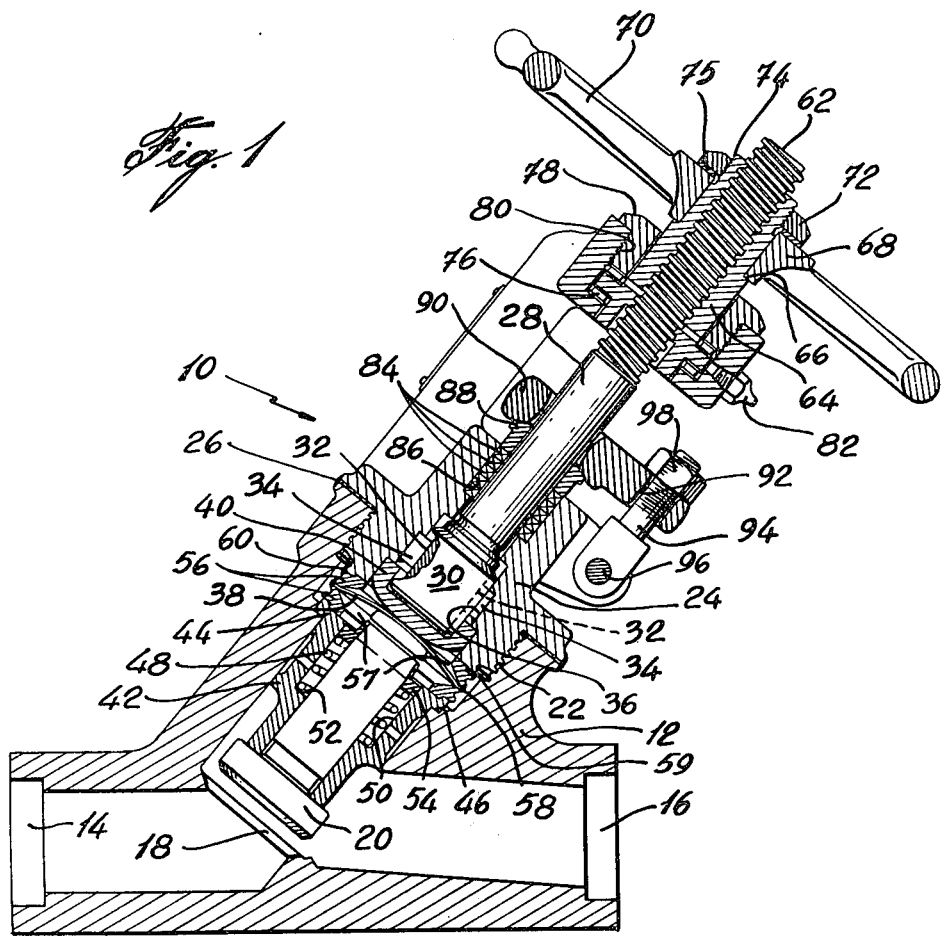
FIG. 1 is a side elevation of the improved diaphragm valve according to the present invention, broken away to illustrate the constructional features thereof.

In FIG. 1, the improved hermetically-sealed diaphragm glove valve indicated generally by reference numeral 10 has a valve body 12 of forged austenitic stainless steel construction with an inlet end 14 and an outlet end 16 for connecting the valve to adjacent piping. The valve body has an inclined stem design for minimum pressure drop and maximum $C_v$. An integral stellite valve seat 18 to assure maximum seating life is located intermediate the inlet and outlet ends, the seat 18 adapted to receive a piston disc 20 which is movably mounted within the body 12 of the valve. A detailed description of a disc bushing which supports the piston disc 20 within the body 12 is set out below.

Due to its small lift capability, diaphragm valve 10 is limited in size up to $2\frac{1}{2}$ inches and 2500 psi at 600° F. operating conditions. The valve can be utilized for standardization in low and high pressure applications where escaping fluids could be poisonous, cause explosion or fire, or loss is very costly, as in the case of heavy water. The valve can also be utilized in HGTR helium-cooled reactors, or to contain gas in off-gas systems.

A threaded connection 22 is provided between an upper end of the valve body 12 and a valve bonnet 24, with an additional weld 26 being provided about the exterior of the valve at the line of connection between the valve bonnet and body. The weld 26 is designed to prevent leakage of fluids passing through the valve to atmosphere between the bonnet and body. A valve stem 28 is axially movable within the bonnet 24, a lower end 30 of the stem being provided with a pair of grooves 32 for receiving pins 34, the pins 34 also engaging cooperating grooves 36 located in the valve bonnet 24. Engagement of the pins 34 within grooves 32 and 36 prevent rotation of the stem during longitudinal movement thereof. In this way, application of torsional stresses to a diaphragm 38 which might otherwise damage the diaphragm are avoided.

A diaphragm disc 40 is mounted on the lower end 30 of the stem, a lower surface of the disc engaging an upper surface of the diaphragm 38. A lower surface of the diaphragm 38 engages an upper end of the piston disc 20, the piston disc 20 being slidably mounted within a disc guide bushing 42 which is mounted in valve body 12. The disc bushing 42 has an annular, outwardly directed flange 44 which engages a cooperating shoulder 46 located in the body 12 in order to prevent axial movement of the disc guide bushing 42 relative to the housing. The disc guide bushing 42 provides perfect disc seat alignment and stabilization of piston disc 20 at low flow. The piston disc 20 is biased away from the valve seat 18 by means of a spring 48 mounted in an enlarged opening 50 situated in the upper end of the disc guide bushing 42. A lower end of the spring 48 engages a shoulder 52 defining the lower end of the enlarged opening 50, while the upper end of the spring engages a spring guide 54 mounted on the piston disc 20, adjacent the upper end thereof. The spring 48 urges the lower end of the piston disc 20 out of engagement with the valve seat 18, while forcing the upper end of disc 20 into engagement with a lower surface of the diaphragm 38.

Figure 2:
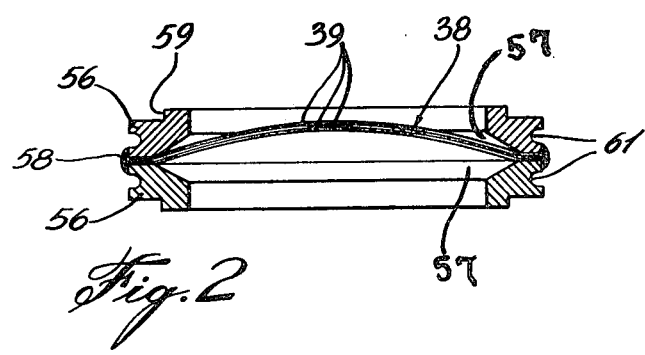
FIG. 2 is an enlarged cross-sectional view of the diaphragm cage unit.

As best seen in FIG. 2, the diaphragm 38 comprises eight to ten thin metal discs or plates 39 made from Inconel 718, a trade mark of The International Nickel Company, Inc. for a group of corrosion-resistant alloys of nickel and chromium. Outer peripheries of the thin Inconel 718 discs 39 are squeezed between a pair of annular Inconel 600 retaining rings 56 and are electrobeam welded to the retaining rings by means of a weld 58 extending about the periphery of the line of connection between the diaphragm 38 and the annular retaining rings 56.

A single Inconel 718 disc 39 can resist a maximum pressure, $P=KE(t/r)^4$ with P the pressure and E the modulus of elasticity, in psi, t the disc thickness and r the radius in inches, and K a coefficient based on geometry. Total pressure resisted by several discs in the sum of each disc's P rating.

Each retaining ring 56 has an inner bevelled edge 57 to permit flexure of the diaphragm 38 between the rings, the bevelled edge 57 extending at an angle of approximately 30° to the plane of contact between the annular rings. The retaining rings 56, together with the diaphragm 38, form a cage unit, the upper retaining ring of which is seal welded to the lower end of the bonnet 24 by means of a seal weld 60 utilizing conventional welding techniques. Alignment of the cage unit relative to the bonnet prior to seal welding the two together is provided by a raised annular shoulder 59 located on an upper surface of the cage unit which engages a cooperating annular depression 59' located in a lower surface of the bonnet 24. Seal weld 60 eliminates the potential leakage path up the stem of the diaphragm valve.

The annular retaining rings 56 are provided with U-shaped annular grooves 61 in the outer cylindrical surfaces thereof. The grooves 61 minimize the heat-sink differential, that is, the difference in heat-dissipating capacities of the annular rings and the diaphragm discs or plates 39 during the welding of the diaphragm elements to the annular retaining rings. A similar annular groove 61a is situated adjacent the lower end of the bonnet, spaced a short distance from the location where the bonnet is welded to the upper annular retaining ring.

In order to provide axial movement of the valve stem 28, the same is provided at its upper end with a threaded portion 62 having a yoke nut 64 mounted thereon. The yoke nut includes an annular shoulder 66 which engages a lower end of a hub portion 68 of a hand wheel 70. The hand wheel 70 is retained in position on the yoke nut 64 by means of a wheel nut 72 threadedly mounted on a cooperating threaded portion 74 situated at an upper end of the yoke nut 64. A washer 75 is located between adjacent surfaces of the wheel nut 72 and hub 68 of the hand wheel 70, thereby retaining the hand wheel in position adjacent the upper end of the yoke nut 64.

The yoke nut 64 is rotatably mounted from the valve bonnet 24 by means of a bearing assembly 76, the bearing assembly being retained in position relative to the upper end of the valve bonnet 24 by means of a yoke bushing 78 which threadedly engages a cooperating threaded opening 80 located in the upper end of the bonnet 24. Since the yoke nut 64, with the hand wheel 70 secured thereto, is rotatably mounted relative to the bonnet 24, rotation of hand wheel 70 results in axial movement of the stem 28 relative to the bonnet 24. Thus, axial movement of the stem 28 downwardly results in an axial force being applied to the diaphragm 38 by means of diaphragm disc 40. This axial force is transferred by the diaphragm 38 to the upper end of the piston disc 20 which is urged into engagement with diaphragm 38 by spring 48, whereby the lower end of the piston disc 20 is moved into engagement with the valve seat 18, thereby restricting flow of fluid through the valve.

Additional constructional features of the valve include a grease fitting 82 situated in the upper end of the bonnet 24 in order to permit lubrication of the bearing assembly 76. Additionally, the stem 28 is provided with a packing ring 84 mounted in an enlarged opening 86 situated within the bonnet 24, with pressure being applied to the packing ring 84 by means of a gland bushing 88 movably mounted on the stem 28 above the packing ring 84, an upper end of the gland bushing being engaged by means of a packing flange 90 which encircles the stem 28. The packing flange 90 includes an offset opening 92 which is engaged by means of a glad bolt 94, the bolt 94 being pivotally secured to the bonnet 24 by means of a hinge pin 96, the bolt extending through the opening 92 and receiving a gland nut 98 thereon. Tightening of the gland nut 98 on the bolt 94 applies a pressure to the packing flange 90, thereby maintaining pressure on the gland bushing 88 and the packing ring 84 is situated therebeneath.

As noted above, the diaphragm 38 comprises 8 to 10 thin INCONEL discs, the thickness of each disc being between 0.006 and 0.008 inches. Welding of the discs to the annular metal members 56 is performed under controlled conditions in a shop or factory while installation thereof in the diaphragm valve bonnet can be effected either in the shop or factory or at a site when replacement of a broken diaphragm is necessary. Since the diaphragm 38 is situated in a separate cage unit and is not welded directly to the bonnet, replacement of a broken diaphragm on the site can be achieved. Likewise, distortion of the thin metal discs forming the diaphragm does not occur as readily when utilizing the cage unit as when welding of the diaphragm discs directly to the bonnet of the valve is effected. In this way, an improved construction of the hermetically sealed diaphragm valve is achieved.

The following procedure sets out the method of manufacturing diaphragm assemblies or cage units. The main operations and sequence of operations comprise the following: manufacturing of discs or plates; manufacture of retaining rings; assembly and welding of rings to disc; forming of diaphragm shape; and stress relieving and heat treatment of diaphragm assemblies.

In the manufacture of the discs 39, round discs are cut from 0.006 to 0.008 inch thick Inconel 718 sheet utilizing existing dies according to the size of the valve. Subsequent to cutting, the discs are deburred, cleaned, degreased and inspected for any dent or damage.

The retaining rings 56 are fabricated from Inconel 600 bar, there being two retaining rings per assembly and 5 to 10 metal discs 39 per cage unit.

The discs 39 are sandwiched between the retaining rings 56, as best illustrated in FIG. 2. While assembling, the discs 39 are stacked in such a manner that the direction of the grain flow in the assembly is displaced in equal angular intervals. The assembly is then peripherally seal welded, utilizing electron beam welding equipment, the seal weld 58 being sufficient to withstand flexing of the diaphragm discs at bevels 57. Prior to welding, the assemblies are mounted on an existing jigging fixture for welding. The jigging fixture holds the retaining rings 56 and disc elements 39 securely and correctly aligned to each other, such that the assembly can be rotated and access to the entire circumference can be achieved to allow the electron beam weld to be produced in one pass without stopping.

By way of example, to electron beam seal weld a diaphragm assembly consisting of two 2.55 inch diameter retaining rings of Inconel 600 and 8 diaphragm discs, 0.006 inch thick, of Inconel 718, the welds are effected with ⅛ inch thick flat stock Inconel 600 using 10 0.005 inch thick shim stock stainless steel 304. The beam is oscillated to 3/32 inch width at top and 1/16 inch width at bottom of weld by 1/16 inch deep. To assure that the assembly will not open, spot welds are made in three places using 30 KV, 20 MA, 0.075 KG/in before electron beam welding all around.

After seal welding, the diaphragms are formed in a special hydraulic forming fixture, the shapes of the diaphragms differing depending upon the size of the particular diaphragm. The diaphragm is especially shaped to assure maximum diaphragm life and to transmit diaphragm flexure to the piston disc 20 situated below the diaphragm 38 in the valve. After forming, the diaphragm assemblies are heat treated to the following specifications: 1700° F./1 hour/AC+1325° F./8 hours/FC at 20° F./hour to 1150° F./AC.

I claim:

1. A method of making a valve bonnet with cage unit for a valve for controlling transmission of critical fluids, comprising the step of:
    (a) stacking a plurality of thin metal discs;
    (b) sandwiching said stacked discs between a pair of annular members, at least one of which is compatible to be welded to said bonnet;
    (c) maintaining said discs in said position between said annular members and applying a weld completely around the peripheral edges of said discs and said annular members to thereby form a peripherally sealed cage unit;
    (d) deforming said sandwiched metal discs to a selected contour;
    (e) heat treating said cage unit by subjecting the same to an annealing and aging process resulting in stress relieving and in the material of said discs having extreme fatigue strength; and
    (f) orientating said cage unit on said valve bonnet and securing the same thereto by peripherally welding a selected one of said annular members to said bonnet to provide a sealed joint therebetween.

2. A method for making a valve including a valve bonnet as defined in claim 1 including the step of assembling said valve bonnet with cage unit to a valve body, including peripherally welding said bonnet to said valve body to provide a sealed joint therebetween.

3. A method as defined in claim 1 wherein said welding around the peripheral edges of said discs and annular members comprises electron beam welding.

4. A method as defined in claim 1 wherein said stacking a plurality of thin metal discs comprises stacking in the range of between five and ten discs.

5. A method as defined in claim 3 wherein said stacking of thin metal discs comprises stacking discs ranging in thickness of between 0.006 and 0.008 inches.

6. A method as defined in claim 5 including the step of making said discs from Inconel 718 material and said annular members from Inconel 600 bar material.

7. A method as defined in claim 1 including stacking said discs in such manner that the direction of the material grain flow in the discs is displaced one to another in substantially equal angular intervals throughout the stack.

8. A method as defined in claim 1 including heat treating said cage unit such that the material of said discs has a high yield strength of 150,000 psi with 115,000 psi fatigue strength at $10^5$ cycles.

9. A method as defined in claim 2 including constructing said valve bonnet and valve body from austenetic stainless steel.

10. A method as defined in claim 1, including the step of contouring said annular members with diverging portions at inner surface portions adjacent to where said discs are sandwiched.

11. A method as defined in claim 2, including forming peripheral heat-sink grooves on said annular members in flanking relation on opposite sides of the peripherally-sealing cage weld whereby one of said heat-sink grooves is disposed between the peripherally-sealing cage weld and the peripherally-sealing weld assembling the cage unit to said bonnet so that assembling of the cage unit to said bonnet does not deteriorate the pre-weld of the cage unit.

* * * * *